(12) United States Patent
Yoshida

(10) Patent No.: US 10,176,848 B2
(45) Date of Patent: *Jan. 8, 2019

(54) RECORDING AND REPRODUCING APPARATUS AND METHOD THEREOF

(71) Applicant: Maxell, Ltd., Kyoto (JP)

(72) Inventor: Mari Yoshida, Yokohama (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/478,020

(22) Filed: Sep. 5, 2014

(65) Prior Publication Data

US 2014/0376879 A1    Dec. 25, 2014

Related U.S. Application Data

(63) Continuation of application No. 12/430,185, filed on Apr. 27, 2009, now Pat. No. 9,159,368.

(30) Foreign Application Priority Data

May 19, 2008  (JP) .................................. 2008-130678

(51) Int. Cl.
   *G11B 27/34*     (2006.01)
   *G11B 27/034*    (2006.01)
   (Continued)

(52) U.S. Cl.
   CPC ........ G11B 27/34 (2013.01); *G06F 17/30852* (2013.01); *G06K 9/00* (2013.01);
   (Continued)

(58) Field of Classification Search
   CPC .... H04N 5/775; H04N 21/4348; G11B 27/34; G06K 9/00; G06K 9/00288;
   (Continued)

(56) References Cited

U.S. PATENT DOCUMENTS

| 5,809,202 A | 9/1998 | Gotoh et al. |
| 7,474,764 B2 | 1/2009 | Segawa et al. |

(Continued)

FOREIGN PATENT DOCUMENTS

| JP | 06-165009 | 6/1994 |
| JP | 2001-045395 | 2/2001 |

(Continued)

OTHER PUBLICATIONS

JP Office Action for Japanese Patent Application No. 2012-063504, dated Apr. 2, 2013.

(Continued)

*Primary Examiner* — Thai Q Tran
*Assistant Examiner* — Syed Hasan
(74) *Attorney, Agent, or Firm* — Mattingly & Malur, PC

(57) ABSTRACT

In a recording and reproducing apparatus and a recording and reproducing method for the recording and reproducing apparatus for recording and reproducing image information on a scene obtained through photographing, relative to a predetermined first recording medium and being capable of setting one or more chapters to each scene, a face recognizing process is executed for a photographed image based on the image information, an importance level of each chapter is set in accordance with a result of the face recognizing process for a very important person (VIP) set by a user, and each chapter having a relevant importance level among importance levels of respective chapters is selectively reproduced. A user can therefore find an object chapter and scene quickly and easily.

20 Claims, 12 Drawing Sheets

(51) Int. Cl.
| | |
|---|---|
| *G11B 27/10* | (2006.01) |
| *G11B 27/28* | (2006.01) |
| *G11B 27/30* | (2006.01) |
| *G06K 9/00* | (2006.01) |
| *G06F 17/30* | (2006.01) |
| *H04N 5/77* | (2006.01) |
| *H04N 5/78* | (2006.01) |
| *H04N 5/85* | (2006.01) |
| *H04N 9/804* | (2006.01) |
| *H04N 5/781* | (2006.01) |
| *H04N 21/434* | (2011.01) |

(52) U.S. Cl.
CPC ...... *G06K 9/00288* (2013.01); *G06K 9/00711* (2013.01); *G11B 27/034* (2013.01); *G11B 27/105* (2013.01); *G11B 27/28* (2013.01); *G11B 27/30* (2013.01); *H04N 5/77* (2013.01); *H04N 5/772* (2013.01); *H04N 5/781* (2013.01); *H04N 5/85* (2013.01); *H04N 9/8042* (2013.01); *G11B 2220/455* (2013.01); *H04N 21/4347* (2013.01)

(58) Field of Classification Search
CPC ........... G06K 9/00711; G06K 9/00221; G06K 9/00228; G06F 3/00
USPC ......... 386/230, 356; 348/239; 382/103, 118; 715/719
See application file for complete search history.

(56) References Cited

U.S. PATENT DOCUMENTS

| | | | |
|---|---|---|---|
| 7,496,211 B2* | 2/2009 | Yamagami | G11B 27/034 382/103 |
| 7,634,662 B2 | 12/2009 | Monroe | |
| 7,853,897 B2 | 12/2010 | Ogawa et al. | |
| 2002/0175997 A1 | 11/2002 | Takata et al. | |
| 2003/0107592 A1 | 6/2003 | Li et al. | |
| 2006/0188225 A1* | 8/2006 | Yamakage | G11B 27/005 386/331 |
| 2007/0019083 A1* | 1/2007 | Nakashima | H04N 5/232 348/239 |
| 2007/0036522 A1 | 2/2007 | Yoshida et al. | |
| 2007/0162924 A1 | 7/2007 | Radhakrishnan et al. | |
| 2007/0171296 A1 | 7/2007 | Tsukiji et al. | |
| 2007/0237360 A1 | 10/2007 | Irie et al. | |
| 2008/0019665 A1 | 1/2008 | Huang et al. | |
| 2008/0131073 A1 | 6/2008 | Ogawa et al. | |
| 2008/0144890 A1 | 6/2008 | Ogawa | |
| 2008/0218595 A1 | 9/2008 | Kawahara | |
| 2008/0225155 A1 | 9/2008 | Ebato et al. | |
| 2008/0256450 A1 | 10/2008 | Takakura et al. | |
| 2008/0279425 A1* | 11/2008 | Tang | G06K 9/00221 382/118 |
| 2008/0309795 A1 | 12/2008 | Mitsuhashi et al. | |
| 2009/0016575 A1 | 1/2009 | Bak et al. | |
| 2009/0059008 A1 | 3/2009 | Ishii | |
| 2009/0135269 A1 | 5/2009 | Nozaki et al. | |
| 2010/0014719 A1 | 1/2010 | Date et al. | |
| 2011/0055766 A1 | 3/2011 | Ogawa et al. | |

FOREIGN PATENT DOCUMENTS

| | | |
|---|---|---|
| JP | 2002-333652 A | 11/2002 |
| JP | 2003-046911 | 2/2003 |
| JP | 2003-150603 | 5/2003 |
| JP | 2003-283993 | 10/2003 |
| JP | 2004-207842 | 7/2004 |
| JP | 2006-033659 | 2/2006 |
| JP | 2006-074463 | 3/2006 |
| JP | 2006-101324 | 4/2006 |
| JP | 2006-101325 | 4/2006 |
| JP | 2006-166408 | 6/2006 |
| JP | 2006-173984 A | 6/2006 |
| JP | 2006-323621 A | 11/2006 |
| JP | 2007-6033 A | 1/2007 |
| JP | 2007-026493 | 2/2007 |
| JP | 2007-049332 | 2/2007 |
| JP | 2007-150603 | 6/2007 |
| JP | 2007-150604 | 6/2007 |
| JP | 2007-281680 | 10/2007 |
| JP | 2007-281858 | 10/2007 |
| JP | 2007-329679 A | 12/2007 |
| JP | 2008-017041 | 1/2008 |
| JP | 2008-017042 | 1/2008 |
| JP | 2008-78713 A | 4/2008 |
| JP | 2008-99038 A | 4/2008 |
| JP | 2008-228134 | 9/2008 |
| JP | 2008-283486 | 11/2008 |
| JP | 2009-033351 | 2/2009 |
| JP | 2009-059445 | 3/2009 |
| JP | 2012-054948 | 3/2012 |

OTHER PUBLICATIONS

JP Office Action for Japanese Patent Application No. 2012-063504, dated Oct. 30, 2012.

Japanese Office Action received in corresponding Japanese Application No. 2016-043206 dated Feb. 7, 2017.

* cited by examiner

FIG. 2

| 21 | 22 | 23 |
|---|---|---|
| 001 | hh:mm:ss:ff | 2 |
| 002 | hh:mm:ss:ff | 1 |
| 003 | hh:mm:ss:ff | 3 |
| ⋮ | ⋮ | ⋮ |
|  |  |  |

| 25 | 26 | 27 |
|---|---|---|
| 001 | filepath/file. jpg | hh:mm:ss:ff ... |
| 002 | filepath/file. jpg |  |
| 003 | filepath/file. jpg | hh:mm:ss:ff ... |
| ⋮ | ⋮ |  |
|  |  |  |

24

| CHAPTER ID | CHAPTER IMPORTANCE LEVEL |
|---|---|
| 001 | 5 |
| 002 | 1 |
| 003 | 5 |
| 004 | 3 |
| 005 | 1 |
| 006 | 5 |
| 007 | 5 |
| 008 | 5 |
| 009 | 3 |

RECORDING AND REPRODUCING APPARATUS AND METHOD THEREOF

INCORPORATION BY REFERENCE

This application is a continuation of application Ser. No. 12/430,185, filed on Apr. 27, 2009, now pending, which claims the benefit of Japanese Application No. JP 2008-130678 filed on May 19, 2008, in the Japanese Patent Office, the disclosures of which are incorporated herein by reference.

BACKGROUND OF THE INVENTION

The present invention relates to a recording and reproducing apparatus and a recording and reproducing method, suitable for application to, e.g., a video camera.

In recent years, recording and reproducing apparatus are in widespread use which apparatus are compatible with randomly accessible recording media such as a digital versatile disc (DVD), a semiconductor memory and a hard disc drive (HDD). Such recording and reproducing apparatus can easily and quickly cue a photographed image recorded in a recording medium.

Of recording and reproducing apparatus of this type, for example, a general video camera manages generally video information of photographed images in the unit of scene, and cues each scene by using management information on each scene. A video camera of this type can set a plurality of chapters in one scene, and can cue each chapter.

A scene means a series of images recorded during a period from when a user depresses a record button to start photographing to when the user depresses again the record button to stop photographing. The number of scenes increases each time photographing is made upon depression of the record button. The chapter means a delimiter of images in one scene.

A user of a video camera can know quickly the contents of each scene by reproducing image information recorded in the recording medium by sequentially cuing each chapter.

However, if the number of chapters set in a scene is large, a user of the video camera is required to repeat a cue operation as many times as the number of chapters set in the scene, in order to confirm the contents to the last scene. There arises therefore a problem of much work and long time.

JP-A-06-165009 discloses techniques of efficiently knowing the contents of a scene by calculating a priority order of each frame from the type of button manipulation during photographing, and reproducing a frame having a higher priority order.

SUMMARY OF THE INVENTION

The capacity of a recording medium of a recent video camera is becoming large so that a scene photographed in a long time duration can be stored in the recording medium or scenes photographed a plurality of times can be stored in the recording medium. It is therefore difficult for a user to quickly find a target scene from a number of scenes recorded in the recording medium.

Some conventional recording and reproducing apparatus are equipped with a function of displaying a list of thumbnail images of scenes. However, this function displays only one thumbnail image per one scene so that a user feels difficult in some cases to know the whole contents of a scene photographed in a long time duration from one thumbnail image. Further, after a lapse of long time after photographing, it is difficult for a user to remember the whole contents of a scene from one corresponding thumbnail image.

If a user cannot remember the contents of a scene even if the thumbnail image is viewed, the user confirms the contents of the scene by reproducing the scene. If the contents of a long time scene is to be confirmed, it becomes necessary to provide a function of confirming quickly the whole contents of the scene by cuing each chapter. However, this function has not been proposed yet.

JP-A-06-165009 discloses techniques of calculating a priority order of each frame from the type of button manipulation during photographing, and when digest reproduction for knowing the contents of a scene is to be performed, reproducing a frame having a higher priority order. According to the techniques, however, a priority degree cannot be set to a scene photographed without button manipulation by a user. It cannot be said that the techniques are easy to use.

The present invention has been made in consideration of the above-described issues, and provides a recording and reproducing apparatus and a recording and reproducing method allowing a user to rapidly and easily find a target chapter or scene.

In order to settle these issues, the present invention provides a recording and reproducing apparatus capable of setting one or more chapters to each scene, comprising: a recording and reproducing unit for recording and reproducing image information on the scene obtained through photographing, relative to a predetermined first recording medium; a face recognizing execution unit for executing a face recognizing process for a photographed image based on the image information; an importance level setting unit for setting an importance level of each chapter in accordance with a result of the face recognizing process for a very important person (VIP) set by a user; and a control unit for controlling the recording and reproducing unit so as to selectively reproduce each chapter having a relevant importance level, among importance levels of respective chapters.

Accordingly, the recording and reproducing apparatus of the present invention can selectively reproduce a particular chapter in accordance with user settings, such as a chapter on which a VIP appears frequently.

The present invention provides further a recording and reproducing method for a recording and reproducing apparatus for recording and reproducing image information on a scene obtained through photographing, relative to a predetermined first recording medium and being capable of setting one or more chapters to each scene, the method comprising: a first step of executing a face recognizing process for a photographed image based on the image information; a second step of setting an importance level of each chapter in accordance with a result of the face recognizing process for a VIP set by a user; and a third step of selectively reproducing each chapter having a relevant importance level, among importance levels of respective chapters.

Accordingly, the recording and reproducing method of the present invention can selectively reproduce a particular chapter in accordance with user settings, such as a chapter on which a VIP appears frequently.

According to the present invention, a user can therefore find an object chapter and scene quickly and easily.

Other objects, features and advantages of the invention will become apparent from the following description of the embodiments of the invention taken in conjunction with the accompanying drawings.

BRIEF DESCRIPTION OF THE DRAWINGS

FIG. 2 is a conceptual diagram illustrating an example of chapter management information.

FIG. 3 is a conceptual diagram illustrating an example of face recognizing management information.

DESCRIPTION OF THE EMBODIMENTS

Embodiments of the present invention will now be described with reference to the accompanying drawings.

(1) First Embodiment

(1-1) Structure of Recording and Reproducing Apparatus

Figure 1:
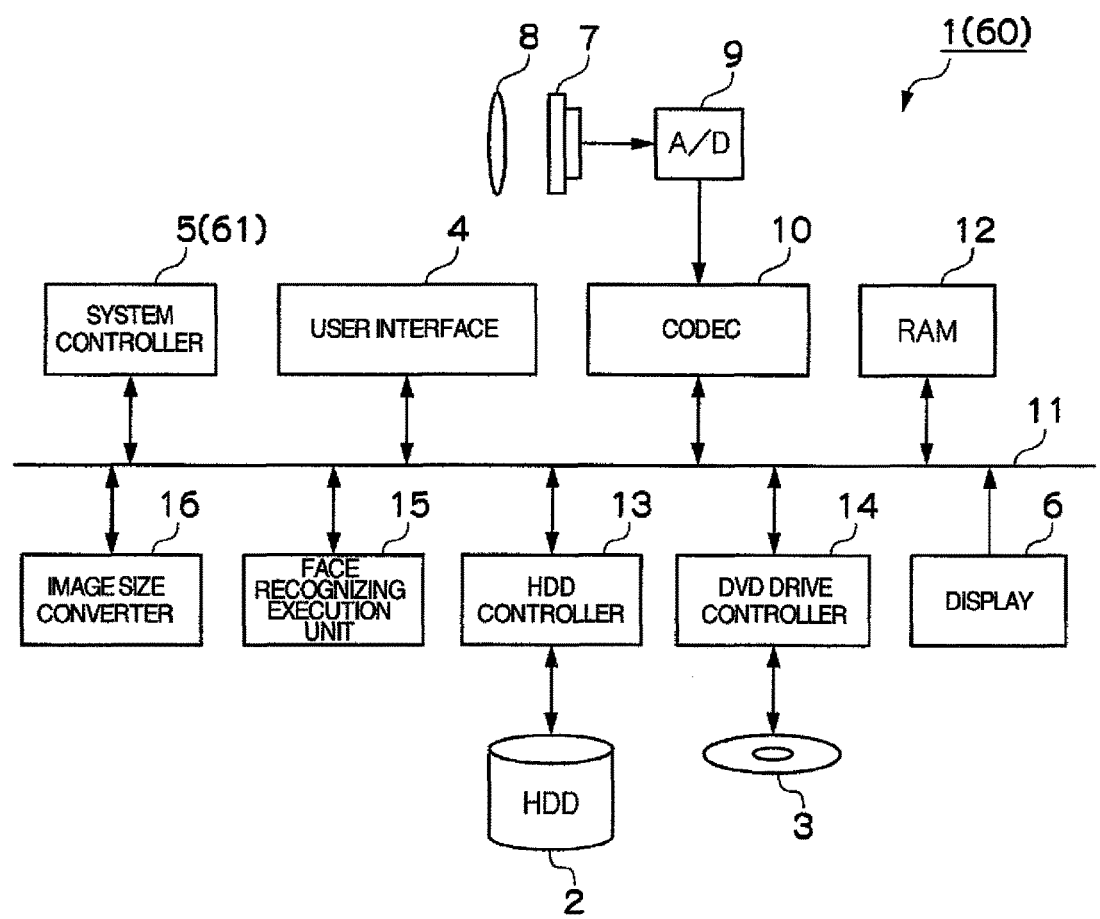
FIG. 1 is a block diagram illustrating the structure of a video camera according to first and second embodiments.

In FIG. 1, reference numeral 1 represents a video camera of the embodiment. The video camera 1 is a hybrid video camera equipped with a DVD drive (not shown) and a built-in hard disc drive 2. A DVD 3 to be mounted on the DVD drive includes a plurality of types such as DVD-R, DVD-RW, DVD-RAM, DVD+R, DVD+RW and HD (High Definition)-DVD. The type of DVD 3 applicable to the video camera 1 is not specifically limited.

In the video camera 1, a user interface 4 is constituted of various operation buttons, a touch panel adhered to a screen of a display 6 to be described later. In accordance with a user operation command input from the user interface 4, a system controller 5 executes a corresponding control process to record a photographed image in the hard disc drive 2 and DVD 3 loaded in the DVD drive and to reproduce a photographed image recorded in the hard disc drive 2 and DVD 3 and display the reproduced image on the display 6.

The system controller 5 is actually a microcomputer constituted of a central processing unit (CPU), an internal memory and the like. When a record button in the user interface 4 is depressed after a record mode is selected upon operation of the user interface 4, the system controller 5 drives an image sensor 7 constituted of a charge coupled device (CCD), complementary metal oxide semiconductor (CMOS) transistors and the like.

An optical image of an object is converged by a lens 8 on an optical reception plane of the image sensor 7. The image sensor 7 photoelectrically converts the optical image, and sends an obtained photographed image signal to an analog/digital converter 9. The analog/digital converter 9 converts the analog photographed image signal into a digital image signal, and sends the obtained digital information to a compressor/decompressor (CODEC) 10.

CODEC 10 transfers the supplied image information to the display 6 via a bus 11. The display 6 may be a liquid crystal display, an organic EL display or the like, and displays a photographed image (through image) basing upon the supplied image information.

CODEC 10 encodes the supplied image information by a predetermined compression encoding method such as a Moving Picture Expert Group (MPEG) method, and stores the obtained encoded image information, and the image information not subjected to encoding, in a random access memory (RAM) 12 via the bus 11.

Under control of the system controller 5, the encoded image information stored in RAM 12 is thereafter read by a hard disc drive controller 13 or a DVD drive controller 14, and recorded in the hard disc drive 2 or DVD 3.

The image information stored in RAM 12 is read by a face recognizing execution unit 15. The face recognizing execution unit 15 executes a predetermined face recognizing process for the photographed image corresponding to the image information, and supplies the recognition results to the hard disc drive controller 13 or DVD drive controller 14 storing the encoded image information, as face recognizing management information to be described later. In this manner, the face recognizing management information is recorded in the hard disc drive 2 or DVD 3, in correspondence with the encoded image information.

When a reproduction button of the user interface 4 is depressed after a reproduction mode is selected upon operation of the user interface 4, the system controller 5 controls a corresponding one of the hard disc drive controller 13 and DVD drive controller 14 to make the hard disc drive controller 13 or DVD drive controller 14 read and transmit the encoded image information to CODEC 10 via the bus 11.

Under control of the system controller 5, CODEC 10 executes a predetermined decoding process for the encoded image information supplied from the hard disc drive controller 13 or DVD drive controller 14, and transmits the obtained reproduced image information to the display 6 via the bus 11. In this manner, a reproduced image corresponding reproduced image information is displayed on the display 6.

An image size converter 16 is also connected to the bus 11. Under control of the system controller 5, the image size converter 16 extracts image information on a start frame of each scene and image information on a start frame of each chapter, from the image information stored in RAM 12 and image information read from the hard disk drive 2 or DVD 3 and decoded by CODEC 10, for example, during photographing. The image size converter 16 converts the extracted image information into image information on thumbnail images of predetermined sizes, and stores the image information on the thumbnail images of a start frame of the scene and a start frame of each chapter in the hard disc drive 2 or DVD 3 storing the encoded image information on the scene, in correspondence with the scene.

It is assumed that the video camera 1 has other hardware and functions of a general video camera, such as light emitting diodes (LED's) for turning on during power-on, charging, access to the hard disc drive 2 or DVD 3, or the like, and batteries for supplying power to each circuit or the like.

In the following description, it is assumed that a photographed image is recorded in the hard disc drive 2 during photographing, and the photographed image is dubbed in DVD 3 after photographing. However, a photographed image may be recorded in DVD 3 during photographing, and the photographed image is dubbed in the hard disc drive 2 after photographing.

(1-2) Scene Management Information

During photographing with the video camera 1, encoded image information as well as management information of each scene (hereinafter called scene management information) is recorded in the hard disc drive 2. The scene management information is constituted of information for managing a scene such as chapter management information and face recognizing management information. The chapter management information includes information on a position, length, importance level, summary and the like of a start frame of each chapter. The face recognizing management information includes information on a position of a frame on which a face recognized by the face recognizing execution unit appears during photographing, an expression and size of the face on the frame, and the like.

FIG. 2 illustrates an example of the chapter management information. The chapter management information 20 illustrated in FIG. 2 is constituted of chapter ID information 21, start frame position information 22 and chapter importance level information 23, respectively of each chapter set in a scene.

The chapter ID information 21 is information representative of a unique ID given to each chapter (hereinafter called a chapter ID), and the start frame position information 22 is information representative of a position (hour, minute, second and frame number) of a start frame of the corresponding chapter. The chapter importance level information 23 is information representative of an importance level set to the corresponding chapter (herein after called a chapter importance level). The details of the chapter importance level will be described later. Under control of the system controller 5, the chapter management information 20 is stored in the hard disc drive 2 in correspondence with the encoded image information of the scene.

FIG. 3 illustrates an example of the face recognizing management information. The face recognizing management information 24 illustrated in FIG. 3 is constituted of face ID information 25 for each face recognized in the corresponding scene, path/file name information 26 and frame position information 27.

The face ID information 25 is information representative of a unique ID given to each face recognized by the face recognizing execution unit 15 (hereinafter called a face ID), and the path/file name information 26 is information representative of a path to the image file of an image of a corresponding face (hereinafter called a face image) or a file name of the image file. A face image to be stored in the image file may be an image captured when the person is recognized first in a frame, or an image capturing the best expression of the person in the scene after distinguishing a good expression such as smile during the face recognizing process.

The frame position information 27 is information representative of a frame position (hour, minute, second and frame number) where a corresponding face is recognized. The frame position information 27 includes all frame positions on which a corresponding face appears. Therefore, the number of frame positions contained in the frame position information 27 becomes larger the larger the number of times when the face (person) appears on the scene. A type of a face expression in a frame may be recorded in correspondence with each frame position.

As described above, the face recognizing execution unit 15 stores the face recognizing management information 24 in the hard disc drive 2 in correspondence with the encoded image information of a photographed image recorded at that time.

(1-3) Chapter Importance Level Setting Method

Figure 4:
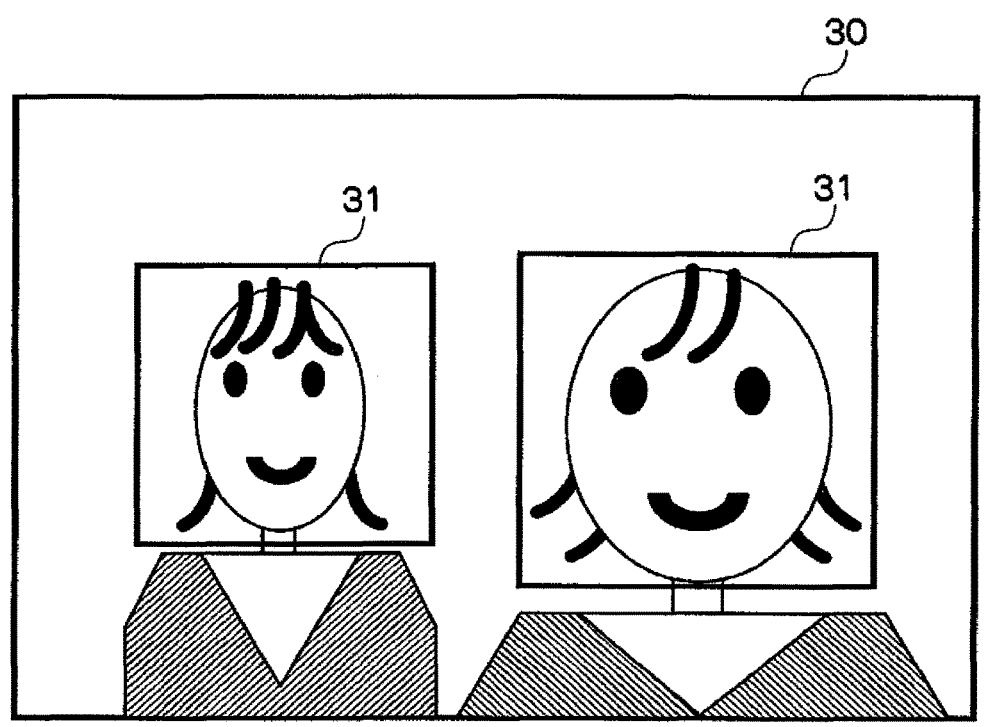
FIG. 4 is a conceptual diagram illustrating an example of a photographed image when face recognizing is made valid.

FIG. 4 illustrates an example of an image photographed by setting a face recognizing function "valid" and displayed on the display 6. As the face recognizing function of the video camera 1 is set "valid", a rectangular frame 31 is displayed in a photographed image 30 displayed on the display 6, surrounding a face of a person detected by the face recognizing function. As the face recognizing function is set "invalid", this frame 31 is not displayed.

Figure 5:
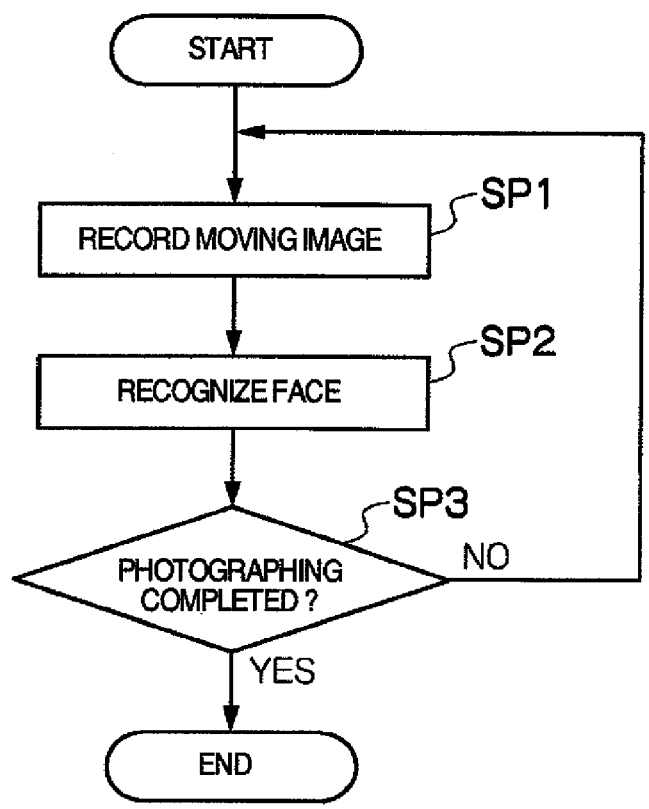
FIG. 5 is a flow chart illustrating the sequence of a photographed image recording process.

FIG. 5 illustrates the contents of a process (hereinafter called a photographed image recording process) of recording an image photographed by setting the face recognizing function "valid" in the hard disc drive 2, to be executed by the system controller 5. The system controller 5 executes the photographed image recording process illustrated in FIG. 5 in accordance with a corresponding control program stored in the internal memory.

More specifically, as the record button of the user interface 4 is depressed after the record mode is selected, the system controller 5 starts the photographed image recording process. First, the analog/digital converter 9 and CODEC 10 are controlled to store image information of the photographed image and encoded image information in RAM 12, and the hard disc drive controller 13 is controlled to read the encoded image information of one frame from RAM 12 and store the read encoded image information in the hard disc drive 2 (Step SP1).

Next, the system controller 5 controls the face recognizing execution unit 15 to read from RAM 12 the image information of the same frame as the frame whose encoded image information was read from RAM 12 by the hard disc drive controller 13 at Step SP1 and execute the face recognizing process for the photographed image corresponding to the image information (Step SP2).

In this case, for example, the face recognizing execution unit 15 executes the face recognizing process by template matching, for example, using an average face. However, if a user forms a VIP list registering VIP's before photographing, the face recognizing process may be executed by template matching using the VIP list. After the face recognizing process is completed, the face recognizing execution unit 15 reflects the results of the face recognizing process upon the face recognizing management information described with reference to FIG. 3 (updating the face recognizing management information).

Next, the system controller 5 judges whether encoded image information of all frames obtained through photographing has been recorded in the hard disc drive 2 (Step SP3). If this judgment is negated, the flow returns to step SP1, and the system controller 5 repeats similar processes (SP1 to SP3, to SP1).

If the judgment is affirmed at Step SP3 after the encoded image information of all frames obtained through photographing is recorded in the hard disc drive 2, the system controller 5 terminates the photographed image recording process.

The face recognizing process at Step SP2 of the photographed image recording process may be executed for each frame as described above, or may be executed once for several frames. As the face recognizing process is executed once for several frames, a process load on the face recognizing execution unit 15 can be reduced.

A function (hereinafter called a post-photographing face recognizing function) may be provided allowing a face recognizing process to be executed for an image already photographed by setting the face recognizing function "invalid", through operation of a menu or the like. The face recognizing management process similar to that illustrated in FIG. 3 can be obtained by this function. With this post-photographing face recognizing function, a chapter importance level can be set using the face recognizing function as will be described later, even for a scene photographed with another video camera without the face recognizing function. This is very convenient for a user.

Next, description will be made on a method of determining an importance level of each chapter in one scene in accordance with the results (face recognizing management information 24 (FIG. 3)) of the face recognizing process obtained in the manner described above.

It is assumed in the following that at least one chapter is set in each scene. A chapter forming method includes a method of making a user manually determine the position of each chapter, a method of automatically setting the position of each chapter where a luminance change is large in the scene, a method of automatically setting chapters at equal pitch of several minutes to several ten minutes, and other methods. In this embodiment, a chapter may be set by any one of these methods.

Figure 6:
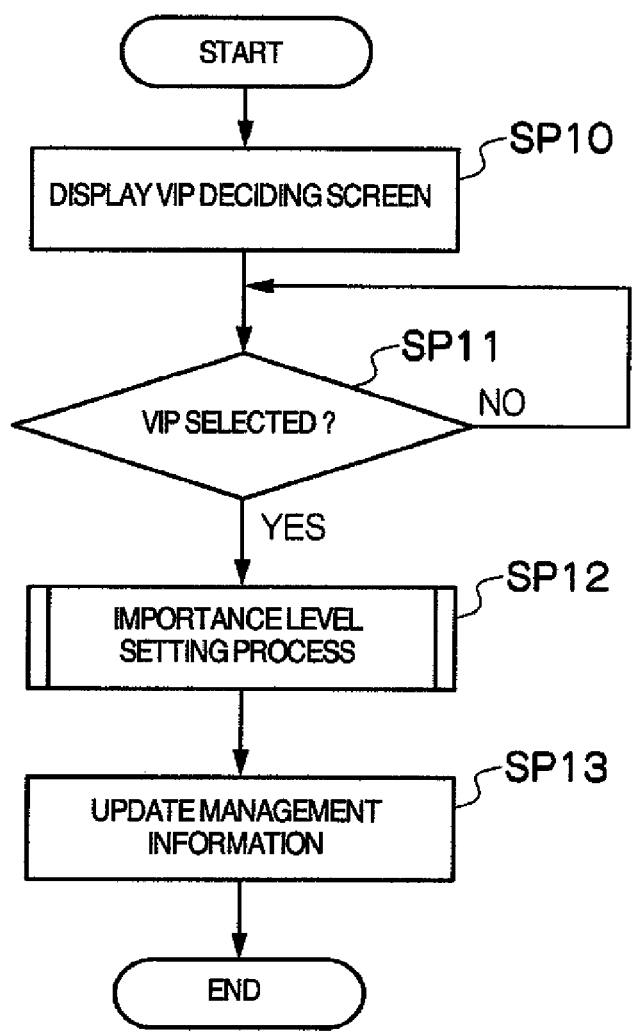
FIG. 6 is a flow chart illustrating the sequence of a chapter importance level setting process.

FIG. 6 illustrates the process contents of the system controller 5 regarding a chapter importance level setting function of setting an importance level of each chapter in a scene. As the user interface 4 is operated and a first screen display request is input, the system controller 5 executes a chapter importance level setting process illustrated in FIG. 6, in accordance with a corresponding program stored in the internal memory (not shown).

Figure 7:
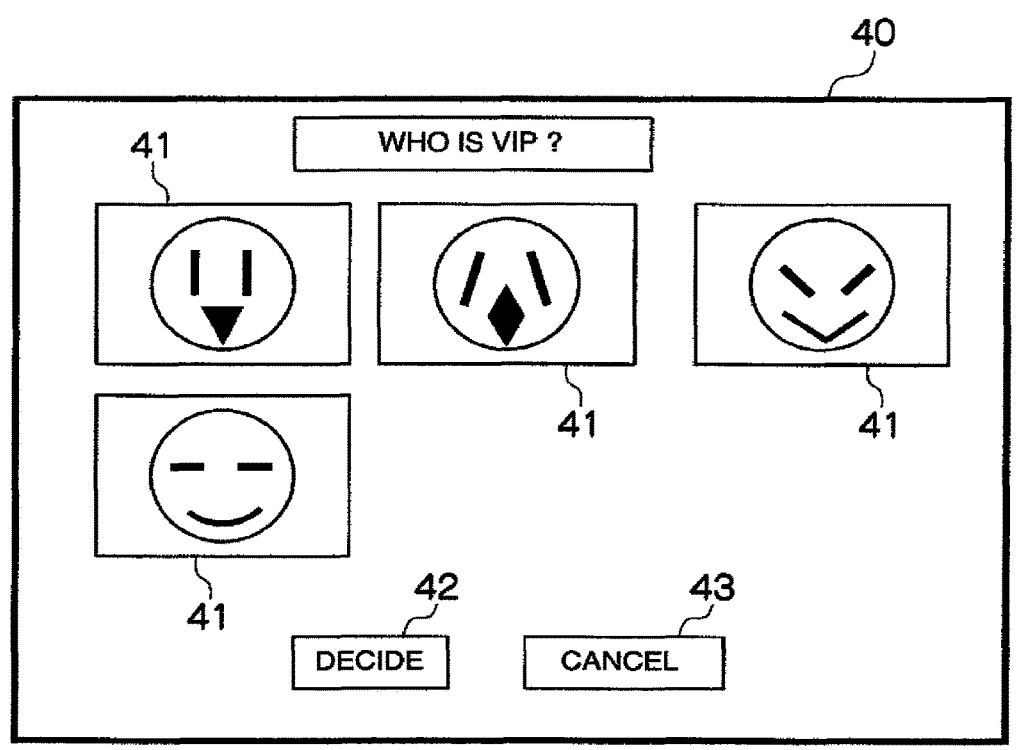
FIG. 7 is a brief diagrammatic view illustrating an example of the layout of a VIP determining screen.

More specifically, upon input of the first screen display request, the system controller 5 reads first the chapter management information 20 (FIG. 2) and face recognizing management information 24 (FIG. 3), stored in the hard disc drive 2, of a scene to be processed at that time (hereinafter called an object scene), and displays a VIP deciding screen 40 illustrated in FIG. 7 on the display 6, by using the chapter management information 20 and face recognizing management information 24 (Step SP10).

The VIP deciding screen 40 is a screen to be used for a user to decide a VIP in the object scene. The VIP deciding screen 40 displays face images 41 of all persons recognized during photographing the object scene. Each face image 41 is displayed in accordance with image data read from the image file identified by a corresponding path/file name information 26 (FIG. 3) in the face recognizing management information 24 described with reference to FIG. 3.

A user can select a VIP from the face images 41 of persons displayed on the VIP deciding screen 40. A plurality of VIP's may be selected. Faces of objects having a high appearance frequency such as family members may be registered beforehand in the video camera 1 as a VIP list, and the faces of only the registered persons are displayed on the VIP deciding screen 40. In this manner, since the face of a person not associated with the object and photographed in the background is not displayed, it becomes easy for a user to decide a VIP.

After the face image 41 of the person desired to be set as a VIP is selected by a predetermined operation, the user depresses a "decide" button 42 to register the selected person as a VIP. If an operation of deciding the chapter importance level is desired to be terminated, a "cancel" button 43 is depressed. If it is arranged in such a manner that a user can set whether such a VIP list is always used or not, user-friendliness of the video camera 1 can be improved.

Next, the system controller 5 stands by until a VIP is decided using the VIP deciding screen 40 (Step SP11). As the user decides a VIP, an importance level of each chapter of the object scene is determined in accordance with the decided VIP (Step SP12).

The system controller 5 reflects the importance level of each chapter decided at Step SP12 upon the chapter management information 20 described with reference to FIG. 2 (Step SP13), to thereafter terminate the chapter importance level setting process.

Figures 8, 9:
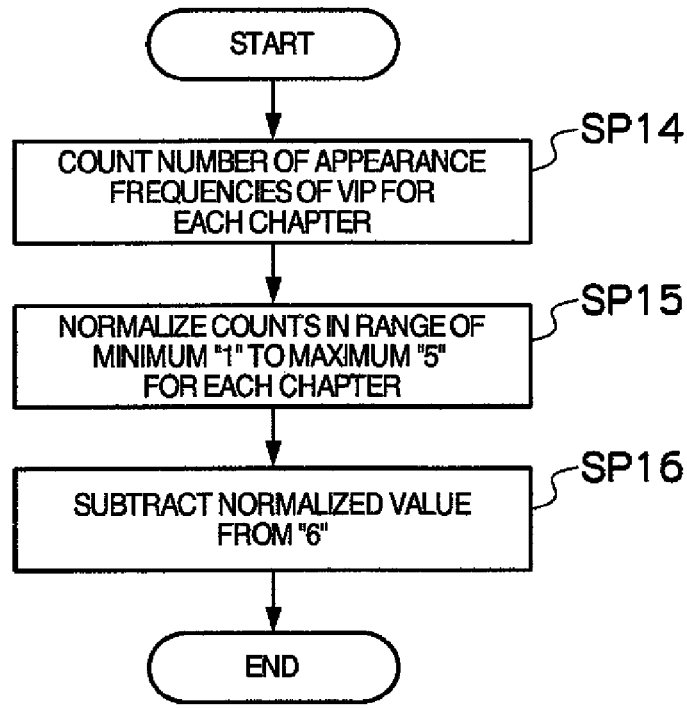
FIG. 8 is a flow chart illustrating the sequence of an importance level determining process.
FIG. 9 is a table illustrating an example of the chapter arrangement of an object scene and a chapter importance level set to each chapter.

FIG. 8 illustrates the specific process contents of the system controller 5 in the chapter importance level setting process at Step SP12.

In the chapter importance level setting process at Step SP12, the system controller 5 starts the importance level setting process. First, the number of appearance frequencies of the VIP decided by the user using the VIP deciding screen 40 (FIG. 7) is counted for each chapter of the object scene (Step SP14).

More specifically, the system controller 5 prepares counters corresponding in number to the number of chapters in the scene, on the inner memory of the system. The system controller 5 reads the positions of all frames on which the VIP decided by the user using the VIP deciding screen 40 appears, from the face recognizing management information 24 (FIG. 3), by using a face ID of the VIP, and judges to which chapter each frame belongs, by referring to the chapter management information 20 (FIG. 2). In accordance with the judgment results, the system controller 5 increments by "1" the count of the counter corresponding to the chapter to which the frame belongs, for each frame on which the VIP appears. The system controller 5 executes these processes for all VIP's decided by the user using the VIP deciding screen 40.

Next, the system controller 5 normalizes the counts of the counters in a range from "1" to "5" (Step SP15), and decides a value obtained by subtracting each normalized value from "6", as an importance level of each chapter corresponding to the counter (Step SP16).

With these processes, the highest chapter importance level of "1" is set to the chapter on which the VIP appears most frequently, and the lowest chapter importance level of "5" is set to the chapter on which the VIP appears least frequently. Thereafter, the system controller 5 terminates this importance level deciding process and returns to the chapter importance level setting process.

If a user selects a plurality of VIP's on the VIP deciding screen 40, the chapter importance levels may be weighted to allow the user to set more important persons. User-friendliness of the video camera 1 can therefore be improved further.

(1-4) Reproducing Method Using Chapter Importance Level

Next, description will be made on an object scene reproducing method basing upon the chapter importance level of each chapter set in the manner described above. It is assumed in the following description that the chapter importance level is set in five steps, "1" being the highest chapter importance level, and "5" being the lowest chapter importance level. In the following, the chapter importance levels are distinguished for the purposes of convenience by calling the chapter importance level "1" superexpress, the chapter importance level "3" express, and the chapter importance level "5" standard.

FIG. 9 illustrates an example of the chapter structure of an object scene and a chapter importance level set to each chapter. In the example illustrated in FIG. 9, the object scene is divided into nine chapters having chapter ID's of "001" to "009". The chapter importance level "1" is set to two chapters having the chapter ID's "002" and "005", the chapter importance level "3" is set to two chapters having the chapter ID's "004" and "009", and the chapter importance level "5" is set to the remaining chapters having the chapter ID's "001", "003", "006" to "008".

In this example, as reproduction is performed by selecting as a reproducing mode a "standard reproducing mode" from the menu, all chapters are sequentially reproduced in an order of smaller chapter ID, irrespective of the chapter importance level set to each chapter. Namely, in the "standard reproducing mode", the chapters having the chapter importance level "5" or smaller (the chapters having the chapter importance levels "1" to "5", i.e., all chapters) are reproduced in this mode of the embodiment.

Further, as a user starts reproducing by selecting as the reproducing mode an "express reproducing mode", the video camera 1 reproduces first the chapter having the chapter importance level "1" and chapter ID "002", then the chapter having the chapter importance level "3" and the chapter ID "004", and next the chapter having the chapter importance level "1" and the chapter ID "005". Lastly, the video camera 1 reproduces the chapter having the importance level 3 and the chapter ID "009" to thereafter terminate scene reproducing. Namely, in the express reproducing mode", only the chapters having the chapter importance level "3" or smaller (only the chapters having the importance levels "1" to "3") are reproduced. Therefore, as cue skipping is performed during reproducing in the "express reproducing mode", reproducing starts from the start frame of the next chapter having the chapter importance level "3" or smaller.

Furthermore, as a user starts reproducing by selecting as the reproducing mode a "superexpress reproducing mode", the video camera 1 reproduces first the chapter having the chapter importance level "1" and chapter ID "002", then the chapter having the chapter importance level "1" and the chapter ID "005" to thereafter terminate scene reproducing. Namely, in the "super express reproducing mode", only the chapters having the chapter importance level "1" are reproduced.

Therefore, the video camera 1 reproduces always the chapter having the chapter importance level "1" as any of the reproducing modes is selected, and each of other chapters is reproduced only when the reproducing mode is selected reproducing the chapter having the chapter importance level same as or smaller than that set to each of other chapters.

By utilizing this function (hereinafter called a chapter select reproducing function), the superexpress reproducing mode is used for confirming roughly the contents of the object scene, and at the stage when reproducing comes near the images whose contents are desired to be confirmed in detail, the reproducing mode is switched to the standard reproducing mode. In this manner, the contents of the object scene can be confirmed efficiently and conveniently. The superexpress reproducing mode is very convenient for a user desiring to confirm the contents of a scene in short time.

Figure 10:
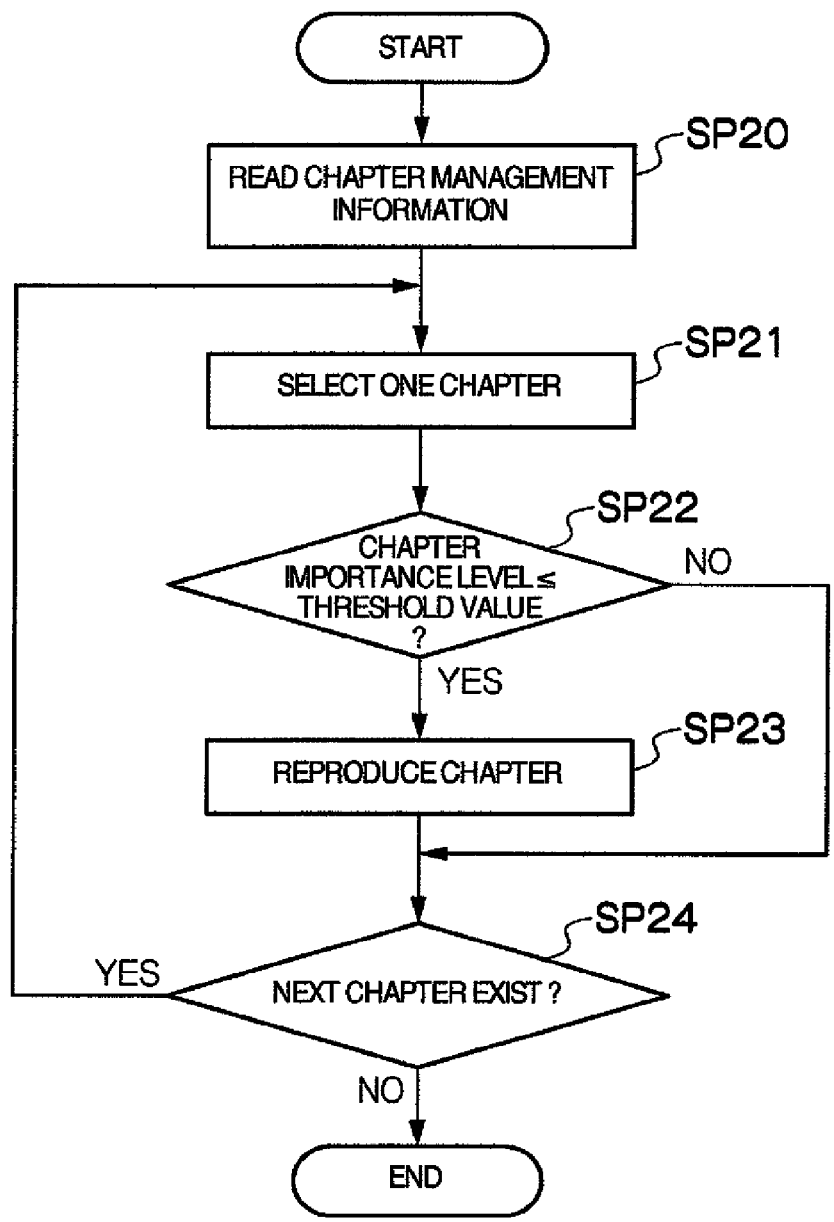
FIG. 10 is a flow chart illustrating the sequence of a chapter selecting and reproducing process.

FIG. 10 illustrates the process contents of the system controller 5 regarding the chapter select reproducing function. The system controller 5 executes the chapter select reproducing process illustrated in FIG. 10 in accordance with a control program stored in the internal memory.

Namely, as a reproducing operation start command is input after the "standard reproducing mode", "express reproducing mode" or "superexpress reproducing mode" is selected, the system controller 5 starts the chapter select reproducing process to first read the chapter management information of the object scene from a corresponding hard disc drive 2 or DVD 3 (Step SP20).

Next, in accordance with the ID information contained in the chapter management information, the system controller 5 selects the first chapter (e.g., the chapter having the smallest chapter ID) (Step SP21), and judges whether the chapter importance level of the chapter is a predetermined threshold value or smaller set to the present reproducing mode (Step SP22). The threshold value is "5" if the "standard reproducing mode" is set, "3" if the "express reproducing mode" is set, and "1" if the "superexpress reproducing mode" is set.

If a judgment at Step SP22 is negated, the flow advances to Step S24, whereas if the judgment is affirmed, the system controller 5 controls CODEC 10 to reproduce the chapter and display the reproduced image on the display (Step SP23).

Next, the system controller 5 refers to the chapter management information to judge whether the chapter next to the chapter selected at Step SP21 exists (Step SP24). If this judgment is affirmed, the flow returns to Step SP21 to repeat similar processes by sequentially switching the chapter to be selected at Step SP21 (Steps SP21 to SP24, to SP21).

As the processes at Steps SP21 to SP24 are completed for all chapters and the judgment at Step SP24 is negated, the system controller 5 terminates the chapter select reproducing process.

Next, description will be made on an approach to making a user to easily confirm the chapter importance level set to each chapter in a scene.

Figure 11:
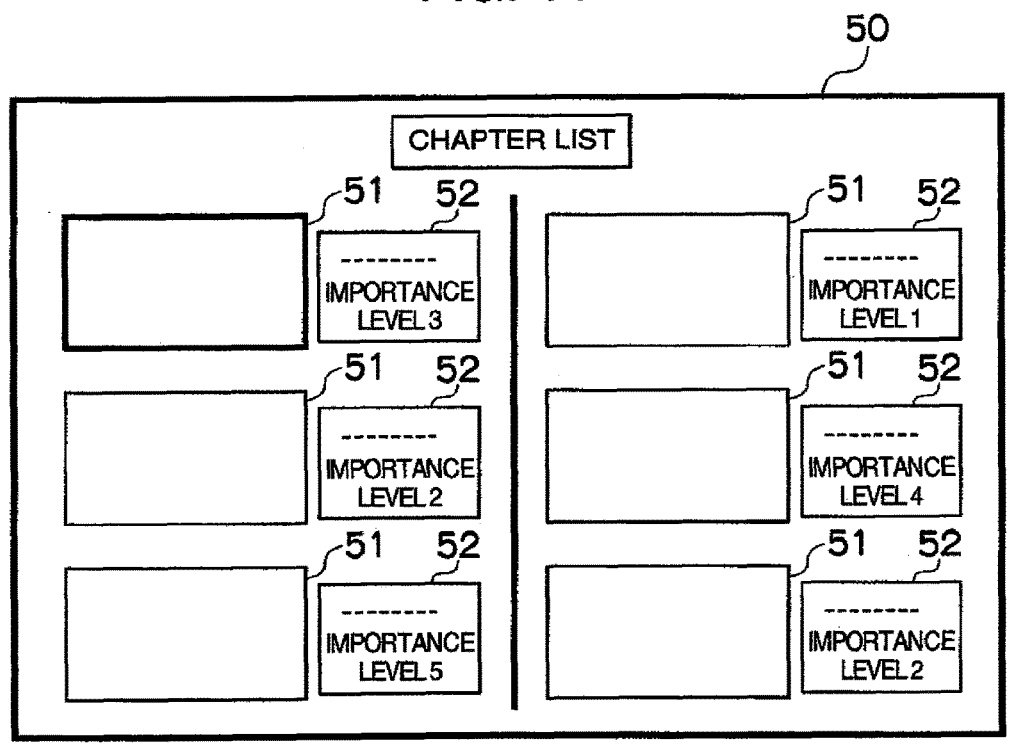
FIG. 11 is a brief diagrammatic view illustrating an example of the layout of a chapter list screen.

FIG. 11 illustrates a chapter list screen 50 displayed on the display 6 by a user menu operation. For each chapter of an object scene, a thumbnail image 51 set to the chapter, and chapter management information 52 such as a lapse time from the scene start, a chapter importance level and the like, are displayed on the chapter list screen 50.

More practically, when a display command for the chapter list screen 50 is input by operating the user interface 4, the system controller 5 controls a corresponding hard disc drive controller 13 or DVD drive controller 14 to read from the hard disc drive 2 or DVD 3 the chapter management information 20 (FIG. 2) of the object scene, and the image information on the thumbnail image 51 of the start frame of each chapter stored in correspondence with the object scene. Then, the system controller 5 operates to display the thumbnail image 51 of the start frame of each chapter on the chapter list screen 50 in accordance with the read image information, and display the management information 52 of each chapter based on the chapter management information 20, on the chapter list screen 50, in correspondence with the thumbnail image 51.

In this manner, a user can know the chapter having a high chapter importance level from the chapter list screen 50, and can find an important image quickly.

Next, description will be made on an approach to making a user easily confirm a scene set with a chapter importance level.

Figure 12:
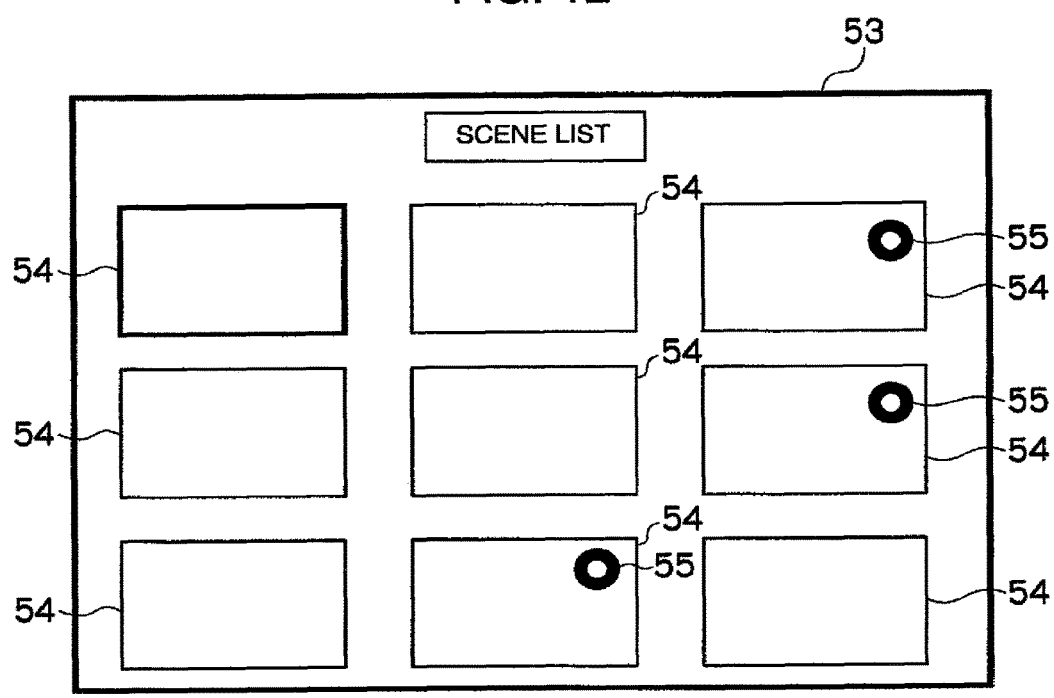
FIG. 12 is a brief diagrammatic view illustrating an example of the layout of a scene list screen.

FIG. 12 illustrates a scene list screen displayed on the display by a user menu operation. A thumbnail image 54 of each scene stored in the hard disc drive 2 or DVD 3 is displayed on the scene list screen 53.

More practically, when a display command for the scene list screen 53 is input by operating the user interface 4, the system controller 5 controls a corresponding hard disc drive controller 13 or DVD drive controller 14 to read from the hard disc drive 2 or DVD 3 the image information on the thumbnail image 54 of the start frame of every scene stored in the hard disc drive 2 or DVD 3 designated by the user. Then, the system controller 5 operates to display the thumbnail image 54 of the start frame of each scene on the scene list screen 53, in accordance with the read image information.

In this case, the system controller 5 refers to the chapter management information 20 (FIG. 2) of each scene, and displays an icon 55 having a predetermined shape on the thumbnail image 54 of the scene set with the chapter importance level.

It is therefore possible for a user to judge from the icon 55 whether a chapter importance level is set to the scene for example, to be reproduced. The contents of the scene displayed with the icon 55 can be confirmed efficiently by immediately performing a reproducing operation by the reproducing method using the chapter importance level as described above. For the scene not displayed with the icon, the chapter importance level setting process is executed before the reproduction operation so that the reproducing operation by the above-described reproducing method can be performed.

(1-5) Scene Dubbing Process

Next, description will be made on a process of dubbing encoded image information recorded in the hard disc drive 2 into DVD 3.

When the scene set with the chapter importance level is dubbed from the hard disc drive 2 into DVD 3 in the video camera 1, the system controller 5 copies not only the encoded image information and scene management information (chapter management information 20 (FIG. 2) and face recognizing management information 24 (FIG. 3) but also an image file of face images of faces registered in the face recognizing management information 24 contained in the scene management information, into DVD 3. Therefore, even if the encoded information in the hard disc drive 2 is erased, reproducing using a chapter importance level and re-setting a chapter importance level can be performed immediately.

(1-6) Effects of the Embodiment

According to the video camera of the embodiment described above, the chapter importance level of each chapter can be set basing upon the results of the face recognizing process executed during photographing. It is therefore possible for a user to quickly find a chapter on which an object person (VIP) appears frequently. Further, a chapter having a relevant chapter importance level is selectively reproduced, among chapter importance levels of respective chapters, so that a user can confirm the whole contents of the scene easily and in short time and can find an object scene quickly. In this manner, user-friendliness of the video camera 1 can be improved considerably.

(2) Second Embodiment

In FIG. 1, reference numeral 60 represents a video camera of the second embodiment. The video camera 60 of the second embodiment is configured like the video camera 1 of the first embodiment, excepting that the chapter importance level setting method is different from that of the first embodiment.

Namely, in the first embodiment, a user decides a VIP by using the VIP deciding screen 40 (FIG. 7) after photographing, and in accordance with the decision, a chapter importance level of each chapter is set. In contrast, in the second embodiment, the face recognizing process is executed only for a VIP decided by a user before photographing, and in accordance with the results of the face recognizing process, a chapter importance level of each chapter is set.

Figure 13:
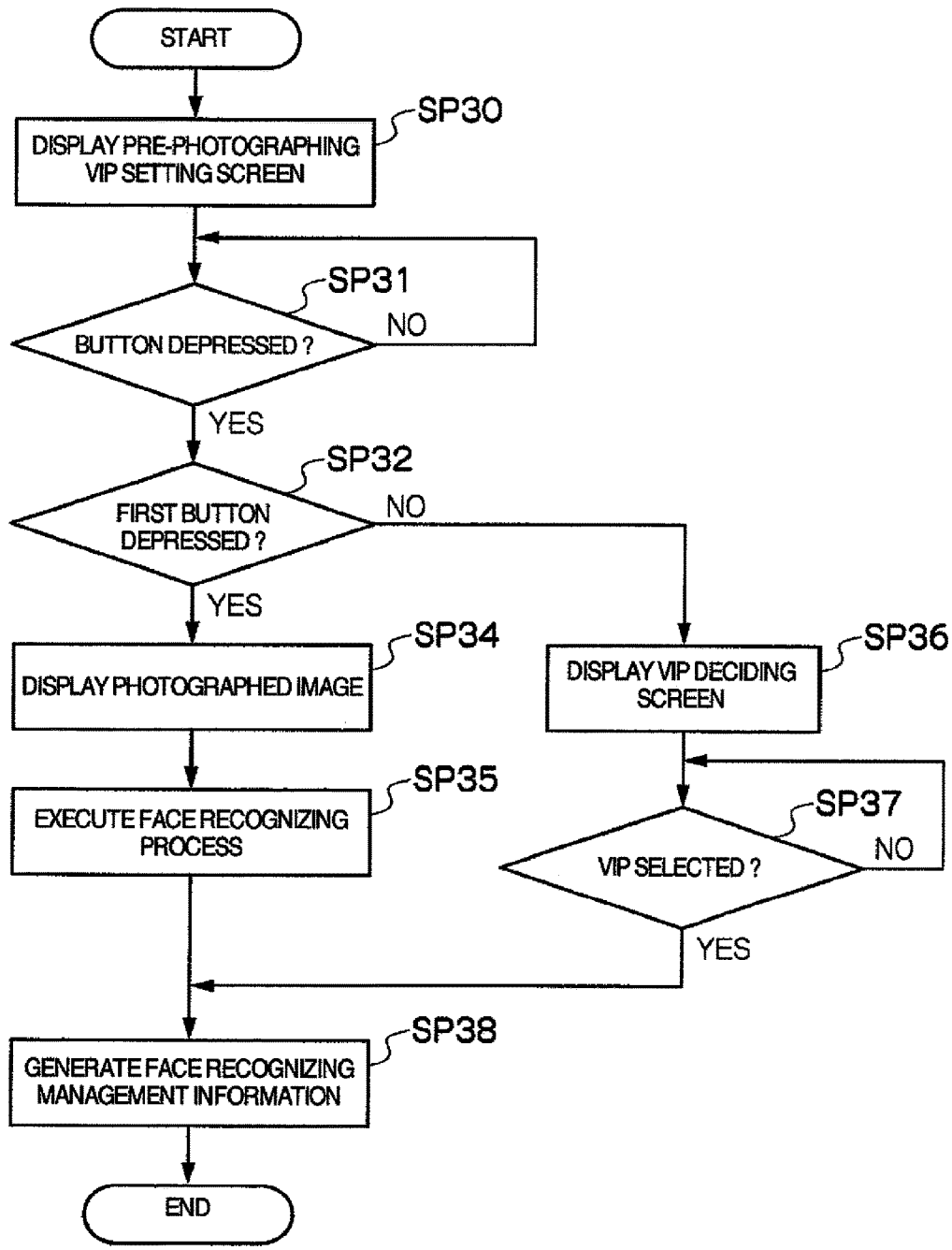
FIG. 13 is a flow chart illustrating the sequence of a VIP setting process.

FIG. 13 illustrates the process contents of the system controller regarding a VIP setting process for a user to set a VIP before photographing, in the chapter importance setting method of the second embodiment. The system controller 61 executes the VIP setting process in accordance with a control program stored in the inner memory (not shown).

Figure 14:
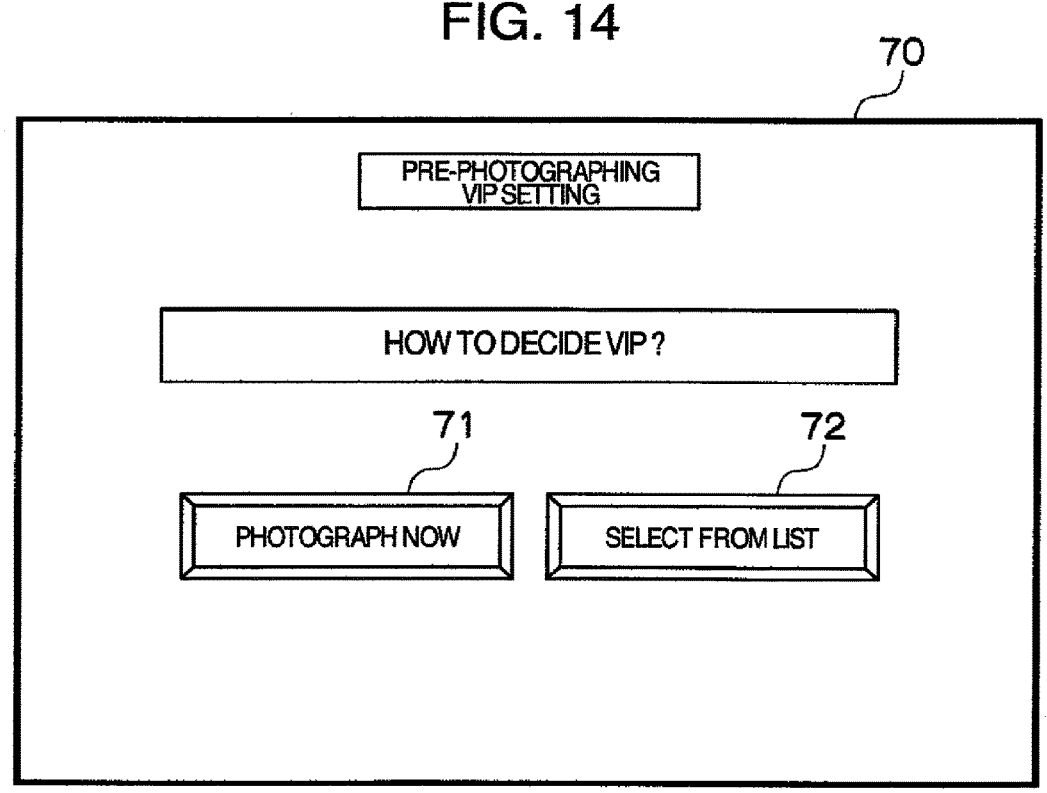
FIG. 14 is a brief diagrammatic view illustrating an example of a layout of a pre-photographing VIP setting screen.

Namely, when a VIP setting mode is selected by operating the user interface 4, the system controller 61 starts the VIP setting process to first display a pre-photographing VIP setting screen 70 illustrated in FIG. 14 on the display 6 (Step SP30).

Next, the system controller 61 stands by until one of first and second VIP deciding method select buttons 71 and 72 displayed on the pre-photographing VIP setting screen 70 (Step SP31) is depressed. The first VIP deciding method select button 71 is a button corresponding to a mode of preparing for photographing a VIP, and the second VIP deciding method select button 72 is a button corresponding to a mode of deciding a VIP among persons recognized during photographing already performed, similar to the first embodiment.

As one of the first and second VIP deciding method select buttons 71 and 72 is depressed, the system controller 61 judges whether the depressed button is the first VIP deciding method select button 71 (Step SP32).

Figure 15:
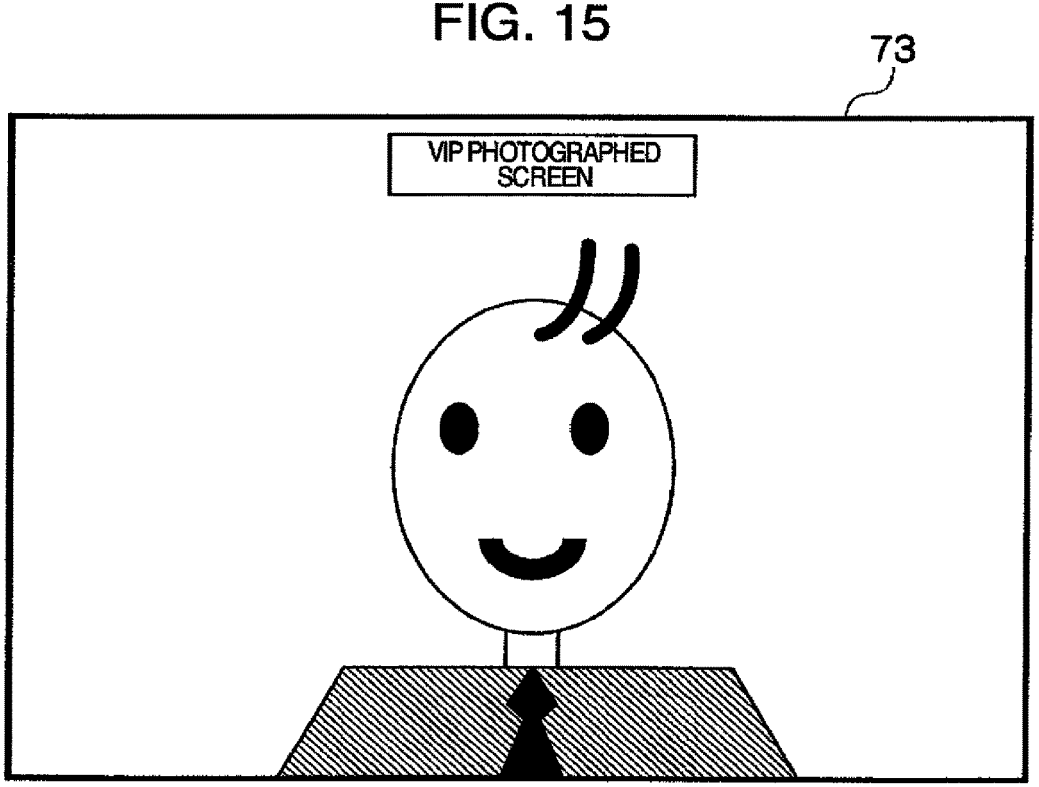
FIG. 15 is a brief diagrammatic view illustrating an example of the layout of a VIP photographing screen.

As this judgment is affirmed, the system controller 61 drives the image sensor 7, analog/digital converter 9 and CODEC 10 to display an image illustrated in FIG. 15 and photographed at that time by a user, on the display 6 (Step SP34). In this case, the user photographs a VIP to be registered with the video camera 60.

Next, during photographing a VIP, the system controller 61 drives the face recognizing execution unit 15 to execute the face recognizing process for the VIP under photographing (Step SP35). After completion of the face recognizing process, the system controller 61 makes the face recognizing execution unit 15 form the face recognizing management information 24 (FIG. 3) based upon the face recognizing process results, and store this information in the hard disc drive 2 (Step SP38). Thereafter, the system controller 61 terminates the VIP setting process.

If the judgment at Step SP32 is negated (i.e., if the second VIP deciding method select button 72 is depressed), the system controller 61 displays the VIP display screen 40 described with reference to FIG. 7 on the display 6 (Step SP36).

Next, the system controller 61 stands by until a VIP is selected from the VIP display screen 40 (Step SP37). As a VIP is selected, the face recognizing execution unit 15 is instructed to form the face recognizing management information 24 illustrated in FIG. 3 registering only information on the selected VIP (Step SP38). Thereafter, the system controller 61 terminates the VIP setting process.

With this arrangement, the system controller 61 controls the face recognizing execution unit 15 to reflect only the results of the face recognizing process for the VIP registered in the manner described above, upon the face recognizing management information 24 (FIG. 3), during photographing. Each time scene photographing is completed, the importance level setting process described with reference to FIG. 8 is executed to determine a chapter importance level of each chapter set in the scene, and in accordance with the determined chapter importance level, the chapter management information 20 (FIG. 2) is updated.

As described above, the video camera 60 of the embodiment executes the face recognizing process only for a VIP decided before moving image photographing, and in accordance with the results of the face recognizing process, a chapter importance level of each chapter is set. It is therefore possible to facilitate setting of the chapter importance level of each chapter. Further, since the video camera 60 registers a VIP in advance as described above, it is possible to avoid the following phenomenon. Namely, in performing autofocus and autoexposure utilizing face recognition, if the face of another person photographed together with a VIP is recognized by chance, the optimum focus and exposure are set to this other person, and the object VIP is not photographed well.

(3) Other Embodiments

In the first and second embodiments, the present invention is applied to the video camera 1, 60 configured as illustrated in FIG. 1. The present invention is not limited thereto, but is also applicable to video cameras having various structures, apparatus other than video cameras such as DVD recorders, electronic still cameras and mobile phones provided with a moving image photographing function.

Further, in the first and second embodiments, although the hard disc drive 2 and DVD 3 are adopted as recording media for recording photographed images, the present invention is not limited thereto, but recording media other than the DVD and hard disc drive may also be adopted including a Blu-ray disc (BD), a compact disc (CD), a mini disc (MD), a semiconductor memory and the like.

Furthermore, in the first and second embodiments, although the hard disc drive 2 and a DVD drive as the recording/reproducing unit for recording and reproducing image information on photographed scenes relative to recording media are built in the video camera 1, 60, the present invention is not limited thereto, but may adopt an external mount type drive connected by USB (Universal Serial Bus), eSATA (External Serial Advanced Technology Attachment) and the like as the recording and reproducing unit.

Still further, in the first and second embodiments, although one system controller 5, 61 is constituted of: an importance level setting unit for setting a chapter importance level of each chapter in accordance with the results of a face recognizing process for a VIP set by a user; a controller for controlling the hard disc drive 2 and DVD drive so as to selectively reproduce a chapter having a relevant importance level, among importance levels of respective chapters; and a VIP setting unit for setting as a VIP a person corresponding to a face image selected by a user from a list of face images displayed on the display, the present invention is not limited thereto, but the importance level setting unit, control unit and VIP setting unit may be structured discretely.

The present invention is widely applicable to various recording and reproducing apparatus such ad DVD recorders in addition to video cameras.

The preferred embodiments of the present invention have been described above. According to the present invention, a particular chapter can be selectively reproduced in accordance with user settings so that a user can find quickly a chapter on which a desired person appears. Further, since a particular chapter based on user settings can be selectively reproduced, a user can know the whole contents of a scene in short time and easily.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording and reproducing apparatus for recording and reproducing video information, comprising:
   a photographing unit for photographing an object and for generating video information;
   a recording unit for recording the video information having been generated by the photographing unit into a recording medium;
   a face-recognition processing unit executing a face-recognizing process on the video information to recognize a face;
   a reproducing unit for reproducing the video information having been recorded by the recording unit from the recording medium;
   a specific person setting unit setting one of a first setting mode and a second setting mode and executing a process of specifying a person with a face according to the set one of the first setting mode and the second setting mode, wherein, when the first setting mode is set, a person is specified with a face recognized by the face-recognition processing unit after the first setting mode is set and before the recording of the video information by the recording unit, and, when the second setting mode is set, a person is specified with a face in the video information in the recording medium that has previously been recorded and previously recognized by the face-recognition processing unit before the specific person setting unit sets the first setting mode or the second setting mode; and
   a control unit for controlling the reproducing unit so as to selectively reproduce the video information from the recording medium which includes the specific person set by the specific person setting unit according to a result of the face-recognition processing unit.

2. The recording and reproducing apparatus according to claim 1, further comprising:
   a user interface unit by which a user selects one of operation modes including:
   (1) a specific person setting mode having the first setting mode and the second setting mode,
   (2) a recording mode in which the video information generated by the photographing unit are recorded in the recording medium, and
   (3) a reproducing mode in which the video information is to be reproduced by the reproducing unit, wherein the control unit controls the recording and reproducing apparatus according to the mode selected by the user interface unit.

3. The recording and reproducing apparatus according to claim 2, wherein the specific person setting mode is configured to specify one or more persons, and the control unit is configured to control the reproducing unit so as to reproduce the video information of the specified one or more persons.

4. The recording and reproducing apparatus according to claim 2, further comprising:
a displaying unit for displaying information of a face to which the face-recognizing processing has been conducted, in case that the recording mode is selected by the user interface.

5. The recording and reproducing apparatus according to claim 2, wherein the reproducing mode selected by the user interface is for reproducing the video information of the specific person specified by the specific person setting unit by which one of a plurality of reproducing modes can be selected, each of the reproducing modes having a respective number of the video information of the specific person, and wherein the control unit controls the reproducing unit so as to reproduce the video information of the specific person according to the selected one of the reproducing modes.

6. The recording and reproducing apparatus according to claim 1, wherein the controlling unit further controlling the reproducing unit to reproduce the video information in a reproducing mode set from one of a first reproducing mode and a second reproducing mode, and
wherein a reproducing time required for reproducing the video information under the first reproducing mode is shorter than a reproducing time required for reproducing the video information under the second reproducing mode, and the video information reproduced under the second mode includes the video information reproduced under the first reproducing mode in addition to other of the video information not reproduced under the first reproducing mode.

7. The recording and reproducing apparatus according to claim 6, wherein the controlling unit further controlling the reproducing unit to reproduce the video information in the reproducing mode set from one of the first reproducing mode, the second reproducing mode, and a third reproducing mode, and
wherein a reproducing time required for reproducing the video information under the third reproducing mode is longer than the reproducing time required for reproducing the video information under the second reproducing mode.

8. A recording and reproducing apparatus for recording and reproducing image information, comprising:
a processor; and
a memory coupled to the processor and storing instructions that, when executed by the processor, cause the processor to:
capture a photograph and generate image information of the photograph;
record the image information in a recording medium;
execute a face-recognizing process on the image information to recognize a face;
reproduce the recorded image from the recording medium;
register a person in the image information as a specific person in a mode selected from a first setting mode and a second setting mode, wherein, when the first setting mode is selected, a person with a face is obtained by newly photographing the person in a photographing mode and thereafter registered as the specific person, and, when the second setting mode is selected, a person with a face in the image information is selected from a plurality of faces in the image information recorded in the recording medium and thereafter registered as the specific person; and
selectively reproduce the recorded image information which includes the registered specific person.

9. The recording and reproducing apparatus according to claim 8,
wherein the image information to be selectively reproduced is the image information which is recognized as including the specific person before the recording of the image information.

10. The recording and reproducing apparatus according to claim 8,
wherein the image information to be selectively reproduced is the image information having a relatively high importance level picked out among the image information recorded in the recording medium which includes the registered specific person.

11. The recording and reproducing apparatus according to claim 8, wherein the memory further stores instructions that, when executed by the processor, cause the processor to:
control the reproduction of the image information in a reproducing mode set from one of a first reproducing mode and a second reproducing mode,
wherein a reproducing time required for reproducing the image information under the first reproducing mode is shorter than a reproducing time required for reproducing the image information under the second reproducing mode, and the image information reproduced under the second mode includes the image information reproduced under the first reproducing mode and other of the image information not reproduced under the first reproducing mode.

12. The recording and reproducing apparatus according to claim 11, wherein the memory further stores instructions that, when executed by the processor, cause the processor to:
control the reproduction of the image information in the reproducing mode set from one of the first reproducing mode, the second reproducing mode, and a third reproducing mode,
wherein a reproducing time required for reproducing the image information under the third reproducing mode is longer than the reproducing time required for reproducing the image information under the second reproducing mode.

13. A recording and reproducing apparatus for recording and reproducing image information, comprising:
a photographing sensor configured to photograph an object and generate image information;
a recorder configured to record the image information generated by the photographing sensor in a recording medium;
a reproducer configured to reproduce the image information recorded by the recorder;
processing circuitry configured to:
execute a face-recognizing process on the image information generated by the photographing sensor to recognize a face,
register a person in the image information as a specific person in a mode selected from a first setting mode and a second setting mode, wherein, when the first setting mode is selected, a person with a face is obtained by newly photographing the person in a photographing mode and thereafter registered as the specific person, and, when the second setting mode is selected, a person with a face in the image information is selected from a plurality of faces in the image information recorded in the recording medium and thereafter registered as the specific person, firstly pick out image information which includes the registered specific person, secondly pick out the image information based on a predetermined condition from among the picked-out image information which includes the registered specific person, the predetermined condition being set in accordance with an instruction by a user, and control the reproducer to selectively and sequentially reproduce the image information picked out based on the predetermined condition.

14. The recording and reproducing apparatus according to claim 13, wherein the image information to be selectively and sequentially reproduced is the image information which is recognized as including the specific person before the recording of the image information by the recorder.

15. The recording and reproducing apparatus according to claim 13, wherein the processing circuitry is further configured to control the reproducer to selectively and sequentially reproduce the image information having the predetermined condition including a relatively high importance level picked out from among the image information recorded in the recording medium which includes the registered specific person.

16. The recording and reproducing apparatus according to claim 13, wherein the processing circuitry is further configured to control the reproducer to selectively and sequentially reproduce the image information picked out based on the predetermined condition in a reproducing mode set from one of a first reproducing mode and a second reproducing mode, and wherein a reproducing time required for reproducing the image information under the first reproducing mode is shorter than a reproducing time required for reproducing the image information under the second reproducing mode, and the image information reproduced under the second mode includes the image information reproduced under the first reproducing mode and other of the image information not reproduced under the first reproducing mode.

17. The recording and reproducing apparatus according to claim 16, wherein the processing circuitry is further configured to control the reproducer to selectively and sequentially reproduce the image information picked out based on the predetermined condition in the reproducing mode set from one of the first reproducing mode, the second reproducing mode, and a third reproducing mode, and wherein a reproducing time required for reproducing the image information under the third reproducing mode is longer than the reproducing time required for reproducing the image information under the second reproducing mode.

18. A recording and reproducing apparatus for recording and reproducing image information, comprising:

a photographing sensor configured to photograph an object and generate image information;

a recorder configured to record the image information generated by the photographing sensor in a recording medium;

a reproducer configured to reproduce the image information recorded by the recorder;

processing circuitry configured to:

execute a face-recognizing process on the image information generated by the photographing sensor to recognize a face;

register a person in the image information as a specific person, wherein a person with a face is obtained by newly photographing the person in a photographing mode and thereafter registered as the specific person;

firstly pick out image information which includes the registered specific person, secondly pick out the image information based on a predetermined condition from among the picked-out image information which includes the registered specific person, the predetermined condition being set in accordance with an instruction by a user, and control the reproducer to selectively and sequentially reproduce the image information picked out based on the predetermined condition.

19. The recording and reproducing apparatus according to claim 18, wherein the processing circuitry is further configured to control the reproducer to selectively and sequentially reproduce the image information picked out based on the predetermined condition in a reproducing mode set from one of a first reproducing mode and a second reproducing mode, and wherein a reproducing time required for reproducing the image information under the first reproducing mode is shorter than a reproducing time required for reproducing the image information under the second reproducing mode, and the image information reproduced under the second mode includes the image information reproduced under the first reproducing mode and other of the image information not reproduced under the first reproducing mode.

20. The recording and reproducing apparatus according to claim 19, wherein the processing circuitry is further configured to control the reproducer to selectively and sequentially reproduce the image information picked out based on the predetermined condition in the reproducing mode set from one of the first reproducing mode, the second reproducing mode, and a third reproducing mode, and wherein a reproducing time required for reproducing the image information under the third reproducing mode is longer than the reproducing time required for reproducing the image information under the second reproducing mode.

* * * * *

UNITED STATES PATENT AND TRADEMARK OFFICE
CERTIFICATE OF CORRECTION

PATENT NO. : 10,176,848 B2
APPLICATION NO. : 14/478020
DATED : January 8, 2019
INVENTOR(S) : Yoshida Page 1 of 1

It is certified that error appears in the above-identified patent and that said Letters Patent is hereby corrected as shown below:

In the Claims

Column (15): Claim 8, Line 62 delete "reproduce the recorded image from" and insert --reproduce the recorded image information from--.

Signed and Sealed this
Sixteenth Day of July, 2019

Andrei Iancu
*Director of the United States Patent and Trademark Office*